Patented Mar. 13, 1923.

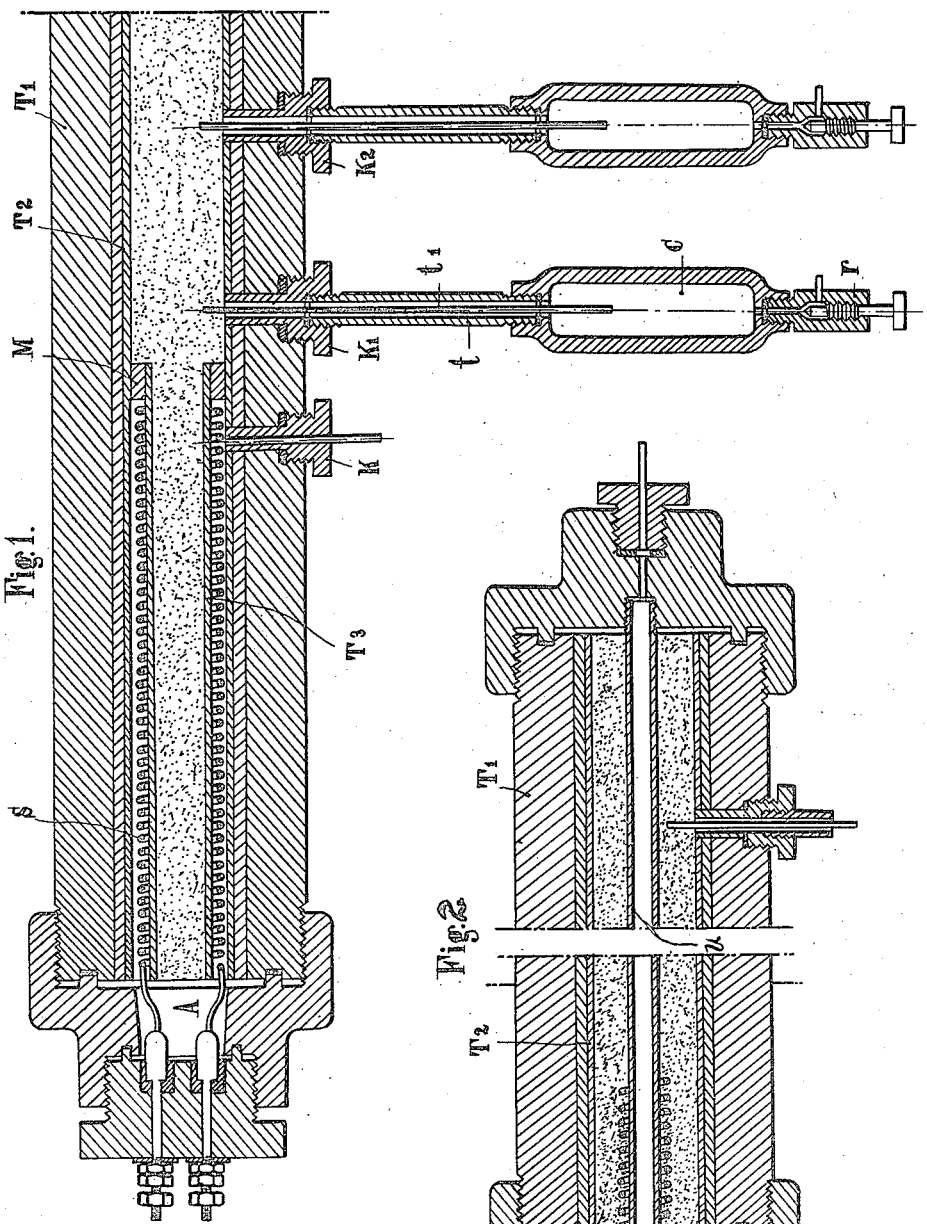

1,448,387

UNITED STATES PATENT OFFICE.

GEORGES CLAUDE, OF PARIS, FRANCE, ASSIGNOR TO L'AIR LIQUIDE, SOCIETE ANONYME POUR L'ETUDE ET L'EXPLOITATION DES PROCEDES GEORGES CLAUDE, OF PARIS, FRANCE.

METHOD OF AND APPARATUS FOR THE DIRECT SYNTHESIS OF AMMONIA AT VERY HIGH PRESSURES.

Application filed November 7, 1918. Serial No. 261,578.

*To all whom it may concern:*

Be it known that I, GEORGES CLAUDE, a citizen of the Republic of France, residing at Paris, France, have invented certain new and useful Improvements in Methods of and Apparatus for the Direct Synthesis of Ammonia at Very High Pressures; and I do hereby declare the following to be a full, clear, and exact description of the invention, such as will enable others skilled in the art to which it appertains to make and use the same.

In an earlier application #222,502, dated March 14, 1918, I have described a method for the synthetic manufacture of ammonia, consisting in passing a mixture of nitrogen and hydrogen compressed to a very high pressure, called "hyperpressure," in the neighborhood of 400 to 2,000 atmospheres, over a catalyzing material at a temperature in the neighborhood of 500 to 700° C. The ammonia formed is separated by liquefaction at ordinary temperature, the residual gas being treated in a second catalyzing apparatus, then in a third and in a fourth, if necessary, with liquefaction of the ammonia formed at the prevailing temperature, between each passage through the catalyzing apparatus. After the last catalysis, the gaseous residue, if it still contains hydrogen, may be employed in the production of power.

The method and apparatus forming the subject matter of the present invention permits of employing a single catalytic apparatus instead of a number. With this object, I utilize a peculiarity resulting from the employment of hyperpressures, and involving the very great difference of density between the gas which has reacted and contains ammonia, and that composed of nitrogen and hydrogen which is about to react. At corresponding temperatures, the first has a density much greater than the second, because of the contraction of the gaseous mixture $N_2 + 3H_2$ during its conversion into $2NH_3$. The difference of density is made very great by the high proportion of ammonia resulting from the use of hyperpressures, which provides a high factor of combination by the very strongly active pressure and by the particularly high compressibility of ammonia as compared to that of its constituents.

It follows that I am thus able to obtain without intermediate mechanism a very active circulation of the gas at the same pressure, even in the two compartments supposed under the same pressure of an exchanger of temperature. I am able, therefore, as hereinafter shown to cause by this means a circulation of a part of the gas, which has passed through a portion of the catalyzing material, thereby bringing it to ordinary temperature and condensing the ammonia which it contains; the remaining gas, which has not reacted, returning to the catalyzing apparatus and to the temperature necessary for combination, and mixing with the gas which has not been separated from its ammonia content. This diminishes of course, the concentration of ammonia in the gas and adds to the efficiency of the synthesis. If I pass this gaseous mixture through another portion of the catalyzing material, then treat a part as before, to again extract ammonia. It will be understood that by repeating this operation a certain number of times, it is possible to finally extract by successive fractions, all of the ammonia formed.

In the accompanying drawing, Figs. 1 and 2 represent, respectively, two forms of apparatus capable of use in carrying out the invention.

In Fig. 1 $T_1$ is a horizontal shell of steel to support hyperpressures, preferably tubular in form; $T_2$ is a thin metallic shell preserving the shell $T_1$ from the destructive action of the temperature and the gas as a result of interposition between $T_1$ and $T_2$ of a bed of insulating material. A shell $T_3$ within $T_2$ is supported at one end by an annular plug M and provides between these two shells an annular chamber traveled by the gas about to react, which enters the apparatus through K and is directed in this space towards A. Thereafter it travels through the shell $T_3$ and the part of the shell $T_2$ which extends beyond the shell $T_3$, both being filled with catalyzing material.

In its travel through K and A, the gas about to react, being in contact with the tube $T_3$, is heated to the reaction temperature, that is to say, 500 to 700° C, as a result of heat liberated by the reaction when the apparatus is functioning normally, or by contact with electric heating means S in starting the reaction. The gas, passing thence through the catalyzing material in $T_3$ and combination being effected progressively, arrives at the end of $T_3$. It ought to have a temperature sufficient to continue the synthesis in the part of the shell $T_2$ beyond M which does not itself constitute, as the preceding part does, an exchanger of temperature with the shell $T_3$.

The proportion of ammonia content in the gas leaving $T_3$ is very important and it is necessary in order to continue the reaction to eliminate all or a part of the ammonia formed. For this purpose, a vertical tube $t$ communicates with $T_2$ through lateral plug $K_1$, and with a collecting receptacle C, the exterior walls of which may be cooled by water. A concentric tube $t_1$ of a smaller diameter passes from the interior of the receptacle C and communicates with the axis of the catalyzing shell $T_2$. The gas charged with ammonia descends by $t_1$ into the receptacle C; the ammonia which it contains condenses and is withdrawn through the valve $r$. The gas becomes thus less dense and returns to the catalyzing shell tube $T_2$ through the outer tube $t$.

Together these tubes $t$ and $t^1$ provide an exchanger of temperature which should be insulated, so that the gas returning through $t$ may be at a temperature very near that of the gas passing in $T_2$ thereby preventing the lowering of the temperature below that necessary for the reaction.

A second separation of gas is effected a little further on in the catalyzer $T_2$ by a second device $K_2$ similar to that just described and the separation is repeated as many times as is necessary for the combination of the gas to be practically complete in the shell $T_2$. The residual gas containing the impurities of the initial gas leaves by a tube (not shown) placed at the extreme right of the apparatus.

Fig. 2 represents another apparatus in which the gas about to react is heated by indirect contact with all of the catalyzing material. It is applied to the particular case where the gas passes, not around the catalyzing shell, but through the interior thereof by a central tube $u$. During its passage in the tube, it is heated to the temperature of the reaction. The withdrawal of the ammonia is then accomplished by apparatus analogous to that above described such as K and the residual gas is withdrawn to the exterior by a tube placed at the extreme right of $T_1$. In either apparatus, the heat liberated by the reaction, which is more than sufficient for heating the incoming gases to the necessary temperature, is eliminated at the exterior of tube $T_1$ by means of a suitable cooling medium.

I claim:

1. A method for the direct synthesis of ammonia at very high pressures which comprises, heating a compressed gaseous mixture of nitrogen and hydrogen by the heat of the combination of these gases to the temperature of the reaction, passing it through a portion of a body of catalyzing material, circulating it by difference of density so that a part of the mixture after reacting descends into a cooler region, thus lowering the temperature of the mixture to the neighborhood of atmospheric temperature, separating the ammonia thus liquefied, reheating by indirect contact with the descending gas the gas ascending and separated from the ammonia, sending it then with a part of the mixture which has not participated in the circulation through another porton of the catalyzing material where the reaction continues, causing successive separations of ammonia as before and rejecting the residual gas.

2. A method for the direct synthesis of ammonia at very high pressures which comprises, passing a compressed gaseous mixture of nitrogen and hydrogen in heat exchange relation with a body of catalyzing material, thus heating the mixture to the temperature necessary for ultimate combination, passing the mixture through a portion of the catalyzing material, circulating by difference of density a part of the mixture which descends into a cooler region, thus lowering the temperature of the mixture to the neighborhood of atmospheric temperature, separating the ammonia thus liquefied, heating by indirect contact with the descending gas the ascending gas separated from ammonia, sending it then with a part of the mixture which has not participated in the circulation through another portion of the catalyzing material where the reaction continues, causing a number of successive separations of the ammonia as before and discharging the residual gas.

3. In an apparatus for the direct synthesis of ammonia, the combination of a chamber supporting a body of catalyzing material, means permitting passage of a gaseous mixture in heat interchanging relation with said catalyzing material to bring said mixture to the reaction temperature and means including a cooled receptacle and a connection between said receptacle and chamber, said means permitting circulation by gravity of a part of said mixture, after reaction induced by said catalyzing material, into said receptacle to separate the ammonia and back to said chamber.

4. In an apparatus for the direct synthesis of ammonia, the combination of a chamber supporting a body of catalyzing material, means permitting passage of a gaseous mixture in heat interchanging relation with said catalyzing material to bring said mixture to the reaction temperature and means including a plurality of cooled receptacles and connections between said receptacles and chamber, said means permitting successive circulation by gravity of parts of said mixture, after reaction induced by said catalyzing material, into said receptacles to separate ammonia and back to said chamber.

5. In an apparatus for the direct synthesis of ammonia, the combination of an outer shell, an inner shell spaced from the outer shell to provide a passage, a body of catalyzing material in said inner shell through which a gaseous mixture passes after traveling in said passage in heat interchanging relation with said catalyzing material and means including a cooled receptacle and a connection between said receptacle and the interior of said outer shell, said means permitting circulation by gravity of part of said gaseous mixture, after reaction induced by said catalyzing material, into said receptacle to separate ammonia and back to said chamber.

6. In an apparatus for the direct synthesis of ammonia, the combination of an outer shell, an inner shell spaced from the outer shell to provide a passage, a body of catalyzing material in said inner shell through which a gaseous mixture passes after traveling in said passage in heat interchanging relation with said catalyzing material and means including a cooled receptacle and concentrically arranged tubes connecting said receptacle with the interior of said outer shell, said means permitting circulation by gravity of part of said gaseous mixture, after reaction induced by said catalyzing material, into said receptacle to separate ammonia and back to said chamber.

7. In an apparatus for the direct synthesis of ammonia, the combination of an outer shell, an inner shell spaced from the outer shell to provide a passage, a body of catalyzing material in said inner shell through which a gaseous mixture passes after traveling in said passage in heat interchanging relation with said catalyzing material and means including a plurality of cooled receptacles and concentrically arranged tubes connecting each of said receptacles with the interior of said outer shell, said means permitting successive circulation by gravity of parts of said gaseous mixture, after reaction induced by said catalyzing material, into said receptacles to separate ammonia and back to said chamber.

GEORGES CLAUDE.